Oct. 4, 1960
W. R. R. PARK ET AL
2,955,054
PROCESS FOR PREPARING HEAT SEALABLE FILMS
Filed Aug. 1, 1958
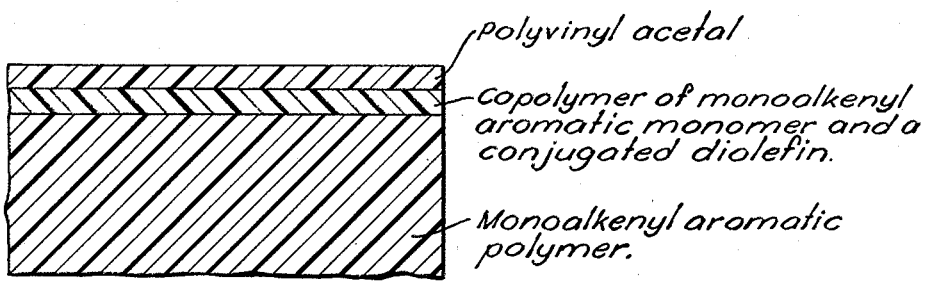
INVENTORS.
William R. R. Park
Richard D. Foley
BY
AGENT

United States Patent Office 2,955,054
Patented Oct. 4, 1960

2,955,054
PROCESS FOR PREPARING HEAT SEALABLE FILMS

William R. R. Park, Midland, and Richard D. Foley, Bay City, Mich., assignors to The Dow Chemical Company, Midland, Mich., a corporation of Delaware Filed Aug. 1, 1958, Ser. No. 752,397

14 Claims. (Cl. 117—72)

This invention relates to a process for imparting heat sealing properties to films which are normally incapable of being heat sealed with conventional apparatus. More particularly, it relates to a process for conferring heat sealing and other improved properties on such films by means of coatings applied thereto.

One of the problems facing the flexible film converter is the attainment of proper closures and seams for various manufactured packages. Such closures and seams may be made with pressure sensitive adhesives or with mechanical closures, such as staples. Both of these methods require multi-step manipulations and are usually inadequate when an impervious seal is desired. With many materials which are thermoplastic, the closures and seams may be formed by drawing the edges of the bag or pouch between two heated shoes to provide a continuous, impervious heat seal. Such a heat sealing technique is well adapted for, and has been universally accepted for use with, high speed packaging operations and is inexpensive in operation. The seals are continuous and as impermeable as the material from which the packaging material is made.

However, many materials, such as oriented polystyrene film, although thermoplastic, cannot be self-sealed in such manner. When polystyrene film and the films of like styrene polymer is attempted to be sealed thermally with the conventionally heated-bar sealers, the result is either that no seal is formed, or an unattractive and unsatisfactory mass of molten polymer is observed, or a shirred discontinuous seal due to shrinkage caused by loss of the orientation of the film results.

Oriented styrene polymer and the like film materials are valuable, flexible packaging films. The extent of their use would be even more widespread if a satisfactory process for heat sealing were available.

It is, accordingly, the principal object of this invention to provide a process for imparting heat sealing properties to those flexible films of styrene polymers which films of themselves are incapable of being conveniently heat sealed using conventional apparatus.

The above and related objects are accomplished by the process consisting of the sequential steps of (1) applying to the styrene polymer article a first continuous adherent coating of a film-forming latex of a styrene-butadiene copolymer, (2) drying said coating, (3) applying as a second continuous coating over said first continuous coating a film-forming solution of a polyvinyl acetal, (4) drying and fusing said second coating. The invention likewise contemplates the coated articles so prepared.

The films which are contemplated as subject materials for use in process of this invention are those flexible films and foils as well as semi-rigid and rigid articles prepared from polystyrene and other monoalkenyl aromatic polymers containing at least 50 percent by weight of a monoalkenyl aromatic monomer having from 6 to 10 carbon atoms in the aryl nucleus, and of the general structure:

$$CH_2=CRAr$$

wherein R is methyl or hydrogen and Ar is the aryl nucleus. By such monoalkenyl aromatic polymers and copolymers it is intended to include the resinous thermoplastic materials resulting from the polymerization of monovinyl aromatic monomers, such as para-methyl styrene, alpha-methyl styrene, meta-ethyl styrene, ortho-para-dimethyl styrene, ortho-para-diethyl styrene, para-chlorostyrene, isopropyl styrene, ortho-methyl-para-isopropyl styrene, and ortho-para-dichlorostyrene, and also those materials resulting from the copolymerization of styrene with alpha-methyl styrene or with one or more of any of the above named compounds. Thermoplastic copolymerizates of styrene or of the other aforementioned compounds with other monoethylenically unsaturated monomers, such as acrylonitrile, may also be used. The term "monoalkenyl aromatic polymer" as used herein is intended to include the thermoplastic polymers and copolymers of monoalkenyl aromatic compounds having the alkenyl radical directly attached to a carbon atom of an aromatic nucleus which compounds may also contain one or more alkyl or halogen atoms as nuclear substituents just described.

Flexible films may be prepared from the above described thermoplastic materials by thermal fabrication, specifically thermal extrusion. Processes, techniques, and apparatuses for such fabrication are known. Other techniques include the solvent casting or dipping of the compositions from a volatile solvent followed by evaporation of that solvent. As prepared, such films must be oriented for flexibility. Unoriented films are so brittle and weak in other properties as to have limited practical utility in packaging or similar uses. Flexible films of these polymerizates of monoalkenyl aromatic monomers may be prepared in a variety of gauges, thicknesses, colors, and widths. Since the modifications contemplated by this invention involve primarily surface phenomena, they are adaptable to any size, shape or thickness where uniform coatings may be applied. The modifications are useful with moldings, extrusions, or any other thick section of a rigid or semi-rigid nature. With such articles of thick section, the need for heat sealability is rather remote. Consequently, the attainment of that property alone may not be justification for the treatment. However, the process results in other advantages as will be described. Thus, it is not intended to limit the process or the resulting articles to any particular size or shape.

The process consists essentially of the application of two separate coatings in consecutive sequence to the thermoplastic substratum. The first coating is of a film-forming latex of a styrene-butadiene copolymer. Such latexes are available commercially. In their usual form, the copolymeric component of such latexes is composed of from about 20 to about 80 percent by weight of styrene with the remainder made up of butadiene. It is imperative that any of the coating materials employed in this process should have at least about the same flexibility and elongation as the substratum, otherwise the coating would crack or split or the article would be damaged in other manner every time a lateral stress was exerted on the article. Such stresses are commonplace in packaging irregularly shaped objects and in packaging with the high speed equipment of the present day. When the copolymer contains appreciably more than about 80 percent styrene, the latexes are usually not film forming by simple deposition. When coatings are prepared by special techniques, the resultant coating is too brittle for use herein. When the coating contains appreciably less than 20 percent styrene the coatings lose considerable of their adhesive power and are thus unsuitable for use herein.

The term styrene-butadiene latex has been employed above for ease of description. It is intended that the invention include film-forming latexes generally of a copolymer of any monoalkenyl aromatic monomer, as defined supra for the operable substrata, and a conjugated diolefin, such as butadiene and the lower alkyl substituted butadienes. Such copolymeric materials will usually follow the compositional characteristics previously mentioned for the styrene-butadiene latexes.

As indicated such latexes are rather generally available. If other latex is desired it may be easily prepared by known emulsion polymerization techniques. As is well known in that art, many considerations besides copolymer composition enter into the film formability of any latex. Chief among those considerations are particle size distribution and polymeric solids content. It is usually true that a latex should have a particle size distribution of about 2000 Angstrom units or less if film formability by simple deposition is to be attained. Additionally, the latex should contain a minimum of at least about 20 percent by weight of polymeric solids to be film forming. Methods and techniques for obtaining such requisite characteristics are known.

A second coating is deposited from a solution of a polyvinyl acetal. The polyvinyl acetals are a well-known class of resins produced by the interaction of polyvinyl alcohol with aldehydes. Methods for their preparation are well known in the literature as exemplified in the reference; "Synthetic Resins and Allied Plastics," R. S. Morrell, Oxford University, London, page 209 (1943). Typical of the available materials are "Alvar 5180" sold commercially by Shawinigan Chemical Company. This material contains about 80 percent acetal resin. Other typical resins are "Bakelite XYSG" and "Bakelite XYHC," sold commercially by Union Carbide and Carbon Company, which contain about 80.7 percent vinyl butyral, 19 percent vinyl alcohol and 0.3 percent vinyl acetate. Other similar resins are known.

Many of the polymeric materials useful for the second coating are also commercially available. If desired they may be prepared by the known polymerization of the appropriate monomers.

The solvents for such polyvinyl acetals are known as indicated in the Morrell reference cited supra. The solubility of the polymeric material will vary somewhat with the degree of replacement of the polymer. Even those of high replacement are soluble in dioxane, acetic acid, and chlorinated solvents. Most of the commercially available polyvinyl acetals are soluble in the lower alkanols having from 1 to about 4 carbon atoms and these are the preferred solvents. It should be apparent that the solvent employed with the polyvinyl acetals must be a non-solvent for the copolymer of the first coating. The styrene-butadiene latexes and the equivalents as described in this application have but limited solubility in the preferred alkanols.

The concentration of film-forming polymeric solids in the polyvinyl acetal solution will be determinable by the coating thickness desired, by the viscosity or fluidity desired with the coating technique to be used, and by the solubility characteristics of the resin-solvent combination desired. Solutions of lower concentration will generally result in dried coatings of thinner section than those of higher concentration. The viscosity of a coating composition that is to be used in brushing or rolling techniques will generally be greater than that of a composition which is to be sprayed. Any of these determinants may be easily checked by simple preliminary experiments and the optimum solute concentration determined.

The second coating preferably contains a small amount of not more than about 4 percent of the weight of solids of a wax. Waxes suitable for the compositions are those having a melting point of at least 60° C. and preferably from about 60° C. to about 100° C. Those with lower melting points cause the coated films to block. Typical representatives of such waxes are those of the following groups: (a) the true waxes, i.e., the esters of high molecular weight monohydric alcohols and higher fatty acids, examples of which are spermaceti, carnauba, montan, beeswax, Japanese wax, Chinese insect wax, etc.; (b) synthetic esters of polyhydric alcohols with the higher fatty acids, e.g. 1,2-hydroxy stearin, glycol stearate, diethylene glycol laurate etc.; (c) high melting fats, such as tallow (ordinarily used in conjunction with one of the other types); (d) synthetic esters of monohydric alcohols with the higher fatty acids, e.g. phenoxy ethyl stearate, lauryloxyethyl laurate, palmitic and stearic esters of the alcohols obtained by reducing palm or sperm oil fatty acids; (e) monohydric alcohols from the hydrogenation of natural oil fatty acids, and (f) monohydric alcohols from the saponification of waxes such as myricyl alcohol, cetyl alcohol and ceryl alcohol. The preferred wax is carnauba wax.

The block temperature mentioned above is the minimum temperature at which two surfaces of film in face to face contact will not slip apart when placed under an applied pressure for a time which is arbitrarily selected. The block temperature is of significance when the film is rolled up on itself and is shipped and stored in such manner. Likewise after conversion to bags and pouches the block temperature assumes an importance not only in shipping and storing, but also in feeding into package filling apparatus. For most commercial applications it has been found that this block temperature should be at least 140° F. when placed under an applied pressure of 1 pound per square inch for 24 hours.

Each of the coatings of this process may be applied by known coating techniques, including brushing, spraying, roller coating, dipping, or other means. To maintain uniform, reproducible properties and characteristics it is essential that each coating be of substantially uniform thickness. Thus, after application or simultaneously therewith, but before drying, of the styrene-butadiene latex there may be used known doctoring means, such as a doctor blade, squeeze rolls, or a planiform stream of air commonly referred to as an air knife, to remove excess latex. A convenient technique is to allow the excess latex to drain off the coated article. For many applications this will provide adequate uniformity of coating thickness. The polyvinyl acetal solution may be applied in similar manner.

After each coating application, the coating is dried and fused into a continuous coherent coating. That drying may occur at room temperature, although it is preferred to employ slightly elevated temperatures of 60° to 70° C. which appreciably shorten the drying step. Temperatures which are significantly higher than 70° C. should usually be avoided, since they tend to distort the shape or in some instances may destroy or at least alter the orientation and other properties and characteristics of the substratum.

To achieve good barrier properties, solvent resistance, and other desirable properties, it is only necessary that each of the dried coatings completely and coherently cover the surface to be coated. As a practical matter such coatings will, if conventional coating techniques are followed, be of a thickness of combined coating of at least 0.00002 inch. Coatings which are greater than about 0.0002 inch are difficult to dry without special apparatus and methods, and impart little or no significant improvement in heat sealing properties over the less thick coatings. Accordingly, it is preferred to have the combined coating of a thickness of from about 0.00002 to 0.0002 inch.

The articles of this invention are illustrated in the annexed drawing. It should be apparent that the invention is not intended to be limited precisely to the illustrated embodiment other than with respect to the composition of each element and its relative position in the article.

The articles prepared in accordance with this invention have the functional advantages of laminate-like structures. Thus, the strength, toughness, flexibility and other like properties of the coated article are determined mainly by the substratum. Other properties, such as heat sealability, barrier characteristics, and solubility, are determined by the second coating. The first or base coating functions to maintain the second coating and substratum in continuous adherent relationship. Thus, both the composition of each coating and their sequence of application are critical to the success of the process. The materials described herein as useful for first coatings will adhere to the substratum and may be heat sealed if attempted immediately after coating application. However, these materials exhibit prohibitively low blocking temperatures and, additionally, lose their heat sealability upon aging. For example, a polystyrene film coated with a dried, fused coating of a styrene-butadiene latex of the type herein described will have a great tendency to adhere to itself when wound in rolls. Similarly sheets treated in the same manner tend to stick together when stacked. Those articles will be very difficult to separate without causing severe impairment of the coating. Additionally, it has been found that such coatings are initially capable of heat sealing but that this capacity is lost upon aging for a relatively short time of one or two weeks.

The materials described as useful for the second coating are not capable of continuous adherence to the substrata contemplated in this invention. Continuous adherence has been found only when the second coating is applied over the first coatings. It has been averred in the prior art that certain surface treatments, such as chlorination, scrubbing, heating to slightly elevated temperatures prior to coating, and precoating with solvents, plasticizers and wetting agents, which when applied to the unmodified substratum will improve the adhesion of subsequently applied coatings and laminae. None of these latter techniques, however, resulted in satisfactory adhesion of the second coating to those articles which lacked the first coating.

The articles may be treated in accordance with this invention on either one or all surfaces depending upon the end use for which the article is to be employed. The articles after treatment may have impressions printed or stamped thereon usually without affecting the barrier, heat sealability, or other properties. Also coated flexible films and foils may be used with conventional wrapping and packaging machinery without serious effect on the coating.

The operation of the process and the advantages thereof will be more apparent from the following illustrative examples wherein all parts and percentages are by weight unless otherwise indicated.

*Example I*

A sample of multi-laterally oriented polystyrene film of a thickness of about 0.001 inch was doctor coated with a film-forming latex of 60 percent styrene and 40 percent butadiene. The solids content of the latex was about 45 percent of the total weight of latex. The latex coating was dried until clear. When dry a second coating was applied over the first. The second coating was cast from a solution consisting of 10 parts "Alvar 5180," 0.5 part tris(p-tertiarybutylphenyl) phosphate as a plasticizer and 150 parts of propanol as a solvent. The second coating was dried until clear. The combined coating thickness was about 0.0001 inch. The result was a clear glossy flexible film. The film was heat sealed to itself by placing the coated surface in contact and passing between the electrically heated jaws of a conventional heat sealer. Continuous heat seals could be made at a jaw temperature of 185° F. The adhesion of the coatings was checked by drying to separate the coating from the substratum using pressure sensitive tapes. No separation could be achieved in this manner. The adhesion of the seal was tested by making a heat seal in the above manner which was 1 inch wide. One of the free ends of the modified film was clamped and the force required to pull the seal apart was determined. It was found that a force of from 200 to 300 grams per inch was necessary to separate the so-formed heat seal.

After several weeks storage, the coated film was still heat sealable and retained its other desirable properties.

By way of contrast when the film was coated with only the styrene-butadiene latex described above, the resultant film when rolled exhibited severe adhesion and blocking and could not be easily unwound. Also, after two weeks aging this coated film was no longer heat sealable. In further contrast when the film was coated with only the polyvinyl acetal solution, the coating was readily separated from the film using pressure sensitive tapes.

*Example II*

The coating operations of Example I were repeated using the same coating materials except that the polyvinyl acetal solution contained, in addition to the named ingredients, about 4 percent of carnauba wax. When the coatings were dried, there was considerable improvement in blocking tendencies over those of Example I. The films so modified were heat sealable at 185° F. as in the previous example.

*Example III*

The coating operations of Example I were repeated using the polyvinyl butyrals sold commercially as "Bakelite XYHL" and "Bakelite XYSG" by Union Carbide and Chemicals Corporation. After drying the films were found to be heat sealable at about 185° F. and were found to require from 200 to 300 grams per inch to pull the seal apart.

What is claimed is:

1. A process for imparting heat sealability to thermoplastic articles fabricated from the polymerizates of monoalkenyl aromatic monomers consisting of the sequential steps of (1) applying to at least one surface of said thermoplastic article a continuous uniform coating of a film-forming latex of a copolymer of a monoalkenyl aromatic comonomer and a conjugated diolefin; (2) drying said coating to a clear coherent coating; (3) applying to the so-treated surface a continuous uniform coating of a solution of a polyvinyl acetal; and, (4) drying said coating of step (3) to a clear coherent coating.

2. The process claimed in claim 1, wherein the article to be treated is a flexible film.

3. The process claimed in claim 2, wherein said flexible film is an oriented film of polystyrene.

4. The process claimed in claim 2, wherein said flexible film is coated on one surface.

5. The process claimed in claim 2, wherein said flexible film is coated on all exposed surfaces.

6. The process claimed in claim 1, wherein said film-forming latex of step (1) is of a copolymer of styrene and butadiene composed of from about 20 to about 80 percent by weight of styrene.

7. The process claimed in claim 1, wherein each of said drying steps (2) and (4) is carried out at room temperature.

8. The heat sealable article based on a substratum which has been fabricated of a monoalkenyl aromatic polymer, said article consisting of a first dried continuous coating in continuous adherent relationship to said substratum, said dried continuous coating consisting essentially of a copolymer of a monoalkenyl aromatic monomer and a conjugated diolefin and a second dried continuous coating in continuous adherent relationship to said first coating, said second coating consisting essentially of a polyvinyl acetal.

9. The article claimed in claim 8, wherein said substratum is a flexible film.

10. The article claimed in claim 9, wherein said flexible film is multi-laterally oriented.

11. The article claimed in claim 9, wherein said substratum is coated on one surface.

12. The article claimed in claim 9, wherein said substratum is coated on all exposed surfaces.

13. The article claimed in claim 8, wherein said first dried continuous coating is composed of a copolymer of styrene and butadiene containing from about 20 to about 70 percent by weight of styrene.

14. The article claimed in claim 8, wherein said second continuous coating is composed of a polyvinyl butyral.

References Cited in the file of this patent

UNITED STATES PATENTS

| | | |
|---|---|---|
| 2,430,931 | Hershberger | Nov. 18, 1947 |
| 2,525,676 | Hoffman | Oct. 10, 1950 |
| 2,824,024 | Chapman | Feb. 18, 1958 |
| 2,860,071 | Cohen | Nov. 11, 1958 |
| 2,864,722 | Millar | Dec. 16, 1958 |
| 2,880,116 | Alps | Mar. 31, 1959 |